United States Patent [19]

Bussler

[11] 3,955,829
[45] May 11, 1976

[54] BICYCLE KICKSTAND SUPPORT PAD

[76] Inventor: Thomas M. Bussler, Rte. 5, Box 78, N. Straits Highway, Cheboygan, Mich. 49721

[22] Filed: Mar. 19, 1975

[21] Appl. No.: 559,764

[52] U.S. Cl. .............................. 280/301; 248/188.9; 280/293
[51] Int. Cl.² .......................................... B62H 1/02
[58] Field of Search .......... 280/293, 294, 295, 298, 280/301, 304; 248/42, 314, 188.9, 40

[56] References Cited
UNITED STATES PATENTS

| | | | |
|---|---|---|---|
| 862,945 | 8/1907 | Tiffany | 280/301 |
| 3,063,668 | 11/1962 | Yohe | 248/42 X |
| 3,342,445 | 9/1967 | Bouwkamp | 248/188.9 |
| 3,712,640 | 1/1973 | Shipman | 280/301 |

FOREIGN PATENTS OR APPLICATIONS

| | | | |
|---|---|---|---|
| 1,942 | 5/1877 | United Kingdom | 248/40 |
| 178,554 | 10/1953 | Austria | 280/301 |
| 60,356 | 1/1939 | Norway | 280/301 |

Primary Examiner—M. H. Wood, Jr.
Assistant Examiner—John P. Silverstrim

[57] ABSTRACT

A pad intended to be affixed to the lower end of a conventional bicycle kickstand and adapted to engage the ground when the kickstand is in the operative position extending downward and outwardly from the bicycle on which it is mounted, the pad including a flat disc shaped base with a bosslike projection extending upwardly from a top surface thereof and having a socket extending thereinto at an angle adapted to receive the bottom terminal end of the kickstand therein for affixing the pad thereto. The pad spreads the weight of the bicycle over a greater surface area providing a more stable support for the bicycle when resting on the kickstand.

4 Claims, 4 Drawing Figures

U.S. Patent May 11, 1976 3,955,829
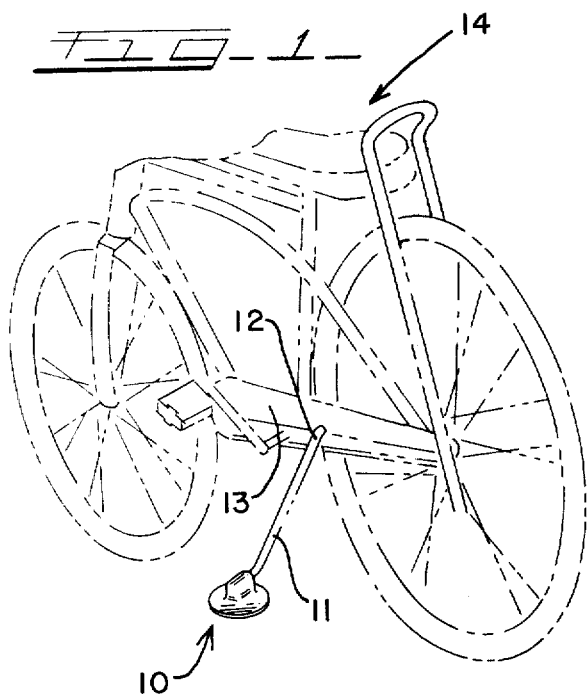
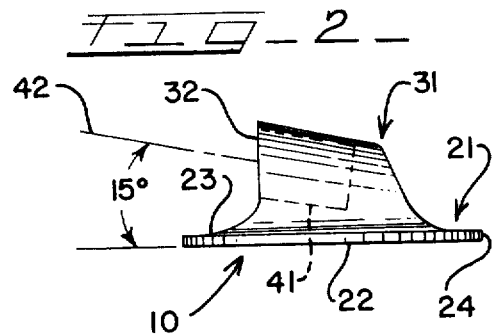
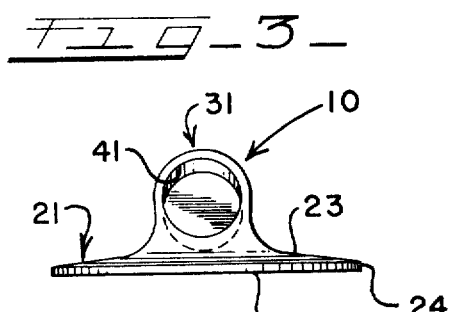
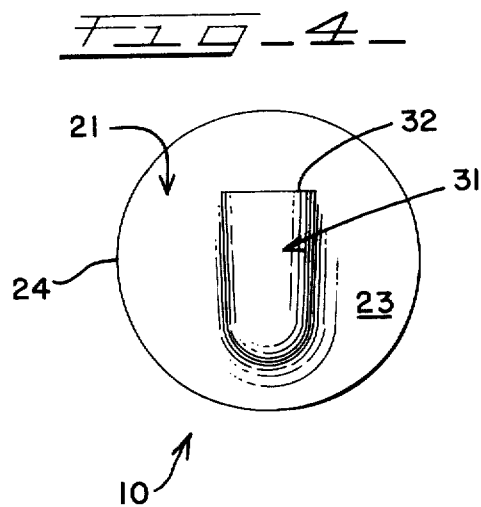

BICYCLE KICKSTAND SUPPORT PAD

BACKGROUND OF THE INVENTION

1. Field of the Invention

This invention relates generally to bicycle accessories and more particularly to a novel support pad for a bicycle kickstand.

2. Description of the Prior Art

It has been long known in the prior art to provide a kickstand for a bicycle, such kickstands having become conventional in structure as to having a mounting bracket secured to the frame of the bicycle and having an arm rotatively affixed at one end thereto with its opposite end bent outward at an angle relative to the axis of the arm, the arm adapted to be pivoted between an inoperative position extending longitudinally of the bicycle and an operative position extending downwardly and outwardly from the bicycle with the terminal bent end adapted to engage the ground to support the bicycle.

One of the disadvantages of the conventional type of kickstand is that it is a common occurrence when using the kickstand to hold a bicycle in an upright position on soft ground or uneven ground, the kickstand of the bicycle tends to sink into the ground, this sinking increasing the angle of inclination of the bicycle in relationship to the ground such that soon the center of gravity of the bicycle reaches the point where the bicycle falls, this possibly causing damage to the bicycle and its accessories.

SUMMARY OF THE INVENTION

The present invention recognizes the deficiencies and disadvantages of conventional present kickstands for bicycles, and provides a novel solution thereto in the form of a support pad adapted to be affixed to the terminal end of the kickstand arm, the pad including a ground engaging disc shaped base member which operates to spread the weight of the bicycle over a greater ground surface area than the normal terminal end of a conventional kickstand, this providing a more stable and secure support for the bicycle.

It is a feature of the present invention to provide a bicycle kickstand support pad.

A further feature of the present invention provides a bicycle kickstand foot pad which is devoid of moving parts and which, therefore, is unlikely to get out of order.

Still a further feature of the present invention provides a bicycle kickstand support pad which is relatively simple in its construction and which, therefore, may be readily manufactured at a relatively low cost and by simple manufacturing methods so that it can be retailed at a sufficiently low price to encourage widespread use thereof.

Yet still a further feature of the present invention provides a bicycle kickstand support pad which is easy to use and reliable and efficient in operation.

Still yet a further feature of the present invention provides a bicycle kickstand support pad which may come in its entirety, the manufacturer that installed as part of the original equipment of the bicycle kickstand, or which may be attached to the kickstand later as an accessory item.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of the support pad of the present invention affixed to a conventional bicycle kickstand illustrated mounted on a conventional type bicycle;

FIG. 2 is a side elevational view of the support pad of the invention;

FIG. 3 is a back elevational view of the support pad of the invention; and

FIG. 4 is a top plan view of the support pad of the invention.

Description of the Preferred Embodiment

Referring now to the drawings in detail, there is illustrated a preferred form of a bicycle kickstand support pad constructed in accordance with the principles of the present invention and which is designated generally in its entirety by the reference numeral 10 and is illustrated for illustrative purposes as affixed to the terminal end of a conventional kickstand arm 11 suitably supported at its top end 12 to the frame 13 of a conventional bicycle 14.

The support pad 10 may be manufactured out of metal, wood, hard rubber, plastic, or any other suitable satisfactory material, with the preferred embodiment being manufactured of a one piece unitary high density polyethylene which may be provided in a variety of colors for matching or complementing the color of the bicycle 14.

The support pad 10 is comprised of a flat disc shaped base 21 which is about two inches in diameter and is formed of a flat bottom surface 22, a generally convex top surface 23, and cylindrical sidewall surfaces 24.

A boss projection 31 is formed integrally with disc base top surface 23 and projects upwardly and outwardly therefrom about one-half of an inch and is of a generally elongated cylindrical configuration having a flattened base portion and which is provided in one end 32 thereof with a cylindrical socket 41 opening thereinto and measuring about five-eighth inch in diameter, the axis 42 of the socket being disposed at an angle of fifteen degrees from the plane of the disc base bottom surface 22.

In operation, the terminal end of kickstand arm 11 is snugly inserted into socket 41 such that bottom surface 22 is disposed generally parallel to the ground surface when the quickstand is placed in the operative position. In this way, the weight of the bicycle 14 is spread over a greater surface area, namely the surface area of bottom surface 22, rather than merely the small surface area of kickstand terminal end arm 11, this providing a more stable and secure support for maintaining the bicycle in an upright position when supported by the kickstand.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A support pad intended for use with the terminal end of an arm of a conventional kick stand for a bicycle wherein the terminal end is pivotably supported by the arm for movement between a storage position spaced from the ground and an operative position adapted to engage the ground, the support pad comprising, in combination:
    a disc shaped base member consisting of a flat bottom surface, a somewhat convex top surface and cylindrical side wall surfaces;
    a boss member projecting upwardly from the top surface of the disc shaped base member, the boss projection and disc shaped base being integrally formed as a unitary member, said boss extending integrally from the top surface of the disc shaped base member and centrally thereof and projecting upwardly therefrom in a direction generally normal to the plane of the disc shaped base member, the boss projection being of a generally elongated cylindrical configuration having a flat front end and a closed curved back end; and
    a socket defined inwardly of the boss member and accessible from the exterior thereof and adapted to receive the terminal end of the kick stand arm therein for affixing the support pad to the kick stand arm terminal end, the socket member being of an elongated cylindrical configuration defined interiorally of the boss member and opening out of the flat front end thereof, the axis of the socket being disposed at an angle relative to the plane of the disc base member bottom surface.

2. The support pad as set forth in claim 1 wherein the angle between the axis of the socket and the plane of the bottom surface is fifteen degrees.

3. The support pad as set forth in claim 2 wherein the unitarily formed disc shaped base member and boss member are manufactured of a high density polyethylene material in any of a variety of colors.

4. The support pad as set forth in claim 3 wherein the bottom surface of the disc shaped base member is 2 inches in diameter, the boss member projects above the top surface of the disc shaped base member by ½ inch, and the socket is of a ⅝ inch diameter.

* * * * *